(12) United States Patent
Sun et al.

(10) Patent No.: US 9,625,695 B2
(45) Date of Patent: Apr. 18, 2017

(54) MAGNIFYING ASSEMBLY FOR AN INFRARED MICROSCOPE

(71) Applicant: AGILENT TECHNOLOGIES, INC., Loveland, CO (US)

(72) Inventors: Yinsheng Sun, Glen Waverly (AU); Mustafa Kansiz, Glenroy (AU)

(73) Assignee: Agilent Technologies, Inc., Santa Clara, CA (US)

( * ) Notice: Subject to any disclaimer, the term of this patent is extended or adjusted under 35 U.S.C. 154(b) by 280 days.

(21) Appl. No.: 14/310,143

(22) Filed: Jun. 20, 2014

(65) Prior Publication Data

US 2015/0370056 A1    Dec. 24, 2015

(51) Int. Cl.
*G02B 5/08*      (2006.01)
*G02B 21/02*     (2006.01)
*G02B 17/06*     (2006.01)
*G02B 21/00*     (2006.01)
*G02B 13/14*     (2006.01)

(52) U.S. Cl.
CPC ....... *G02B 21/025* (2013.01); *G02B 17/0621* (2013.01); *G02B 21/0004* (2013.01); *G02B 13/14* (2013.01)

(58) Field of Classification Search
CPC .......... G02B 26/0875; G02B 2207/117; G02B 26/0816; G02B 26/0833; G02B 27/0983; G02B 7/16; G02B 7/182; G02B 7/003; G02B 7/004; G02B 7/005; G02B 7/18; G02B 7/1821; G02B 7/1822; G02B 7/1824; G02B 7/1827; G02B 17/00; G02B 17/02; G02B 17/023; G02B 17/06; G02B 17/0605; G02B 17/0668; G02B 17/0673; G02B 17/0678; G02B 17/0684; G02B 17/0694; G02B 21/00; G02B 21/0076; G02B 21/16
USPC ...... 359/385, 388, 201.2, 226.1, 368, 226.2, 359/384, 822, 350, 351, 353, 354, 362, 359/363, 364, 365, 366, 369, 381, 432
See application file for complete search history.

(56) References Cited

U.S. PATENT DOCUMENTS 3,458,244 A * 7/1969 Klein .................... G02B 15/14
                                                    359/380
4,687,304 A * 8/1987 Piller ................... G02B 21/125
                                                    359/387
5,291,340 A * 3/1994 Kashima ............. G02B 17/061
                                                    359/859

(Continued)

FOREIGN PATENT DOCUMENTS

DE       102012200851 B3    7/2013
EP           1184702        12/2011

(Continued)

OTHER PUBLICATIONS

D. W. Schiering, "An FTIR Microscope," American Laboratory: 33 pp. 26-40, Nov. 1990.

(Continued)

*Primary Examiner* — Arnel C Lavarias (57) ABSTRACT

An infrared microscope includes a sample stage configured to support a sample; an objective configured to focus radiation emanated from the sample to an intermediate image plane between an objective and an infrared detector; and a magnifying assembly including a first set of reflective elements provided in a fixed position and a second set of reflective elements.

18 Claims, 6 Drawing Sheets

(56) References Cited

U.S. PATENT DOCUMENTS

| | | | |
|---|---|---|---|
| 2002/0034000 A1* | 3/2002 | Hoult | G02B 21/04 359/350 |
| 2003/0057374 A1* | 3/2003 | Schuebel | G01J 3/453 250/339.08 |
| 2003/0146386 A1 | 8/2003 | Nagoshi et al. | |

FOREIGN PATENT DOCUMENTS

| | | |
|---|---|---|
| FR | 1602591 | 12/1970 |
| JP | 2001174708 A | 6/2001 |
| JP | 2007264322 A | 10/2007 |

OTHER PUBLICATIONS

Bruker, Product Brochure, Hyperion Series FT-IR Microscopes, 2014.
German Search Report for Application No. 10 2015 211 375.2 dated Jun. 16, 2016.

* cited by examiner

MAGNIFYING ASSEMBLY FOR AN INFRARED MICROSCOPE

BACKGROUND

Infrared microscopes are typically used in conjunction with an IR spectrometer to analyze small samples of various materials.

An infrared microscope typically receives infrared radiation from a source in the spectrometer. The microscope will include a sample stage for carrying a sample to be analysed and a series of optical elements for guiding radiation from the radiation source to the sample stage. These optical elements may include mirrors, lenses, and condensers. The infrared radiation is directed to an infrared detector, typically via a magnification assembly. The sample may also be viewed optically by means of visible radiation, i.e. the microscope functions in both the visible and the infrared spectrums. A variable aperture, which may be computer controlled, is located at the intermediate image plane. The variable aperture enables portions of the sample to be masked.

There is a need to be able to vary the magnification. Known IR microscopes achieve variable magnification via external interchange of the objectives. Others enable the exchange of internal focal plane array (FPA) optical elements, for example, by placing additional lenses or mirrors in the optical path. However, such systems have a number of disadvantages including limited wavelength coverage of the FPA optical elements where lenses are used, and a relatively difficult task of aligning the FPA optical elements due to the multiple surfaces of the lens system. The hygroscopic nature of lenses may lead to degradation in resolution and lenses may further be subject to chromatic aberrations. Moreover, approaches that rely on changes to typical FPA optical element configurations must be incorporated into each microscope at the time of manufacture. That is, it is not generally possible to add the capability to vary magnification to known microscopes that were not built with that capability.

What is needed, therefore, is an infrared microscope that overcomes at least the shortcomings of the known microscopes described above.

BRIEF DESCRIPTION OF DRAWINGS

The described embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION in the following detailed description, for purposes of explanation and not limitation, specific details are set forth in order to provide a thorough understanding of illustrative embodiments according to the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatuses and methods may be omitted so as to not obscure the description of the illustrative embodiments. Such methods and apparatuses are clearly within the scope of the present teachings.

It is to be understood that the terminology used herein is for purposes of describing particular embodiments only, and is not intended to be limiting. The defined terms are in addition to the technical and scientific meanings of the defined terms as commonly understood and accepted in the technical field of the present teachings.

As used in the specification and appended claims, the terms "a", "an" and "the" include both singular and plural referents, unless the context clearly dictates otherwise. Thus, for example, "a device" includes one device and plural devices.

As used in the specification and appended claims, and in addition to their ordinary meanings, the terms "substantial" or "substantially" mean to within acceptable limits or degree. For example, "substantially cancelled" means that one skilled in the art would consider the cancellation to be acceptable. As used in the specification and the appended claims and in addition to its ordinary meaning, the term "approximately" or "about" means to within an acceptable limit or amount to one having ordinary skill in the art. For example, "approximately the same" means that one of ordinary skill in the art would consider the items being compared to be the same.

Generally, it is understood that the drawings and the various elements depicted therein are not drawn to scale. Further, relative terms, such as "above," "below," "top," "bottom," "upper" and "lower" are used to describe the various elements' relationships to one another, as illustrated in the accompanying drawings. It is understood that these relative terms are intended to encompass different orientations of the device and/or elements in addition to the orientation depicted in the drawings. For example, if the device were inverted with respect to the view in the drawings, an element described as "above" another element, for example, would now be below that element.

The present teachings relate generally to optical instruments and more generally to infrared microscopes, particularly those of the type used to carry out infrared spectroscopy (IR).

In accordance with a representative embodiment, an infrared microscope comprises: a sample stage for supporting a sample; an objective configured to focus radiation emanated from the sample to an intermediate image plane between an objective and an infrared detector; and a magnifying assembly comprising a first set of reflective elements provided in a fixed position and a second set of reflective elements. The second set of reflective elements are configured to move between an inoperative position in which radiation is incident on the first set of reflective elements and an operative position in which the radiation is incident on the second set of reflective elements thereby varying the magnification provided by the magnifying assembly.

Illustratively, the second set of reflective elements may be configured to move in unison between the inoperative and the operative positions. This feature offers a simplified and more stable alignment of the magnifying assembly to provide improved repeatability when compared to prior art solutions.

Moreover, the second set of reflective elements may comprise two reflective elements arranged in fixed relation to each other. By minimising the number of optical elements upon which the optical path is incident, the loss of radiation is reduced and optical throughput is optimized.

In a representative embodiment, the second set of reflective elements comprises two reflective elements arranged in opposed relation to each other, each reflective element being centred with respect to an alignment axis extending between a first of the second set of reflective elements and a second of the second set of reflective elements.

Illustratively, the first set of reflective elements may also comprise two reflective elements. Each of the reflective elements may comprise a curved mirror.

Moreover, the magnifying assembly may be positioned such that radiation propagated to a single element detector rather than the infrared detector is not affected by the magnifying assembly.

In a representative embodiment, the magnifying assembly is positioned between the intermediate image plane and the infrared detector.

In accordance with another representative embodiment, a magnifying assembly accessory for an infrared microscope comprises a first set of reflective elements provided in a fixed position and a second set of reflective elements. The second set of reflective elements are configured to move between an inoperative position in which radiation is incident on the first set of reflective elements and an operative position in which the radiation is incident on the second set of reflective elements thereby varying the magnification provided by the magnifying assembly.

Illustratively, the second set of reflective elements may comprise two reflective elements arranged in fixed relation to each other.

Alternatively, the second set of reflective elements may comprise two reflective elements arranged in opposed relation to each other, with each reflective element being centered with respect to an alignment axis extending between a first of the second set of reflective elements and a second of the second set of reflective elements.

In a representative embodiment, the first set of reflective elements may also comprise two reflective elements. Each of the reflective elements may comprise a curved mirror.

Illustratively, the magnifying assembly accessory may be configured to be positioned between an intermediate image plane and an infrared detector of the infrared microscope.

According to yet another representative embodiment, an infrared microscope comprises a sample stage configured to support a sample; an objective configured to focus radiation emanated from the sample to an intermediate image plane between an objective and an infrared detector; and a magnifying assembly comprising a first set of reflective elements provided in a fixed position and a second set of reflective elements. The second set of reflective elements is configured to move between an inoperative position in which radiation is incident on the first set of reflective elements and an operative position in which the radiation is incident on the second set of reflective elements. As such, the magnification provided by the magnifying assembly is varied. The magnifying assembly is positioned between the intermediate image plane and the infrared detector.

Figure 1:
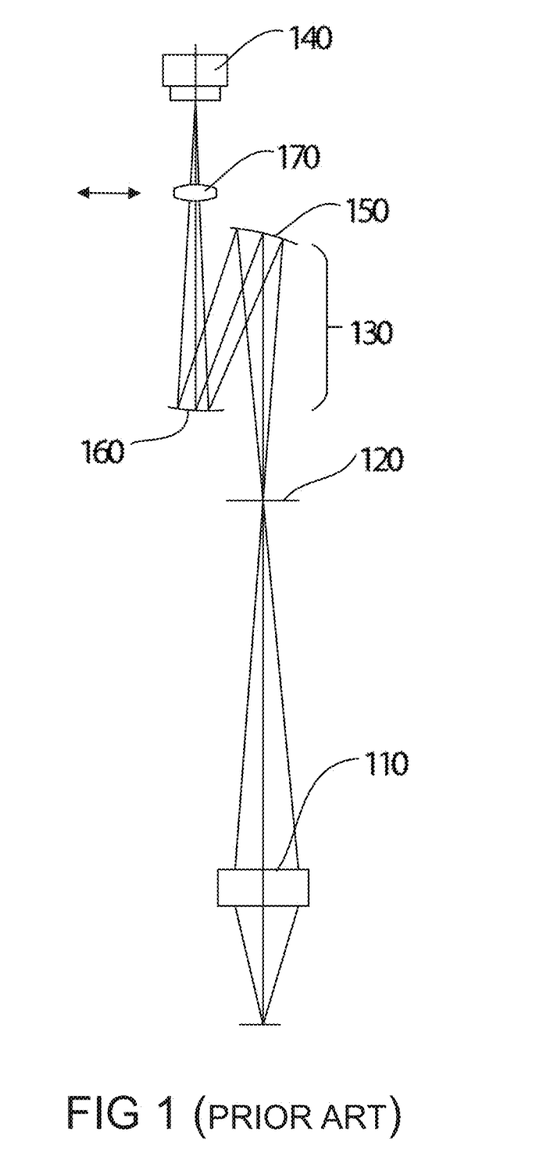
FIG. 1 is a schematic optical diagram showing the elements of a prior art infrared microscope having internally variable magnification.

Referring firstly to FIG. 1, an optical diagram corresponding to a known infrared microscope which enables the magnification to be varied internally is shown. The microscope is integrated with an IR spectrometer which performs the IR analysis of a subject sample. Infrared light is directed to the sample and radiation emanating from the sample is collected by objective 110 which focuses the light in an image plane 120 where a variable aperture is typically located.

FPA optics 130 reimage the aperture onto the detector 140. The FPA optics 130 may comprise a lens or mirror system. In this example the FPA optics 130 comprise a pair of curved mirrors 150, 160. The total magnification of the microscope is a product of the magnification of objective 110, the FPA optics 130 and lens 170.

Figure 2:
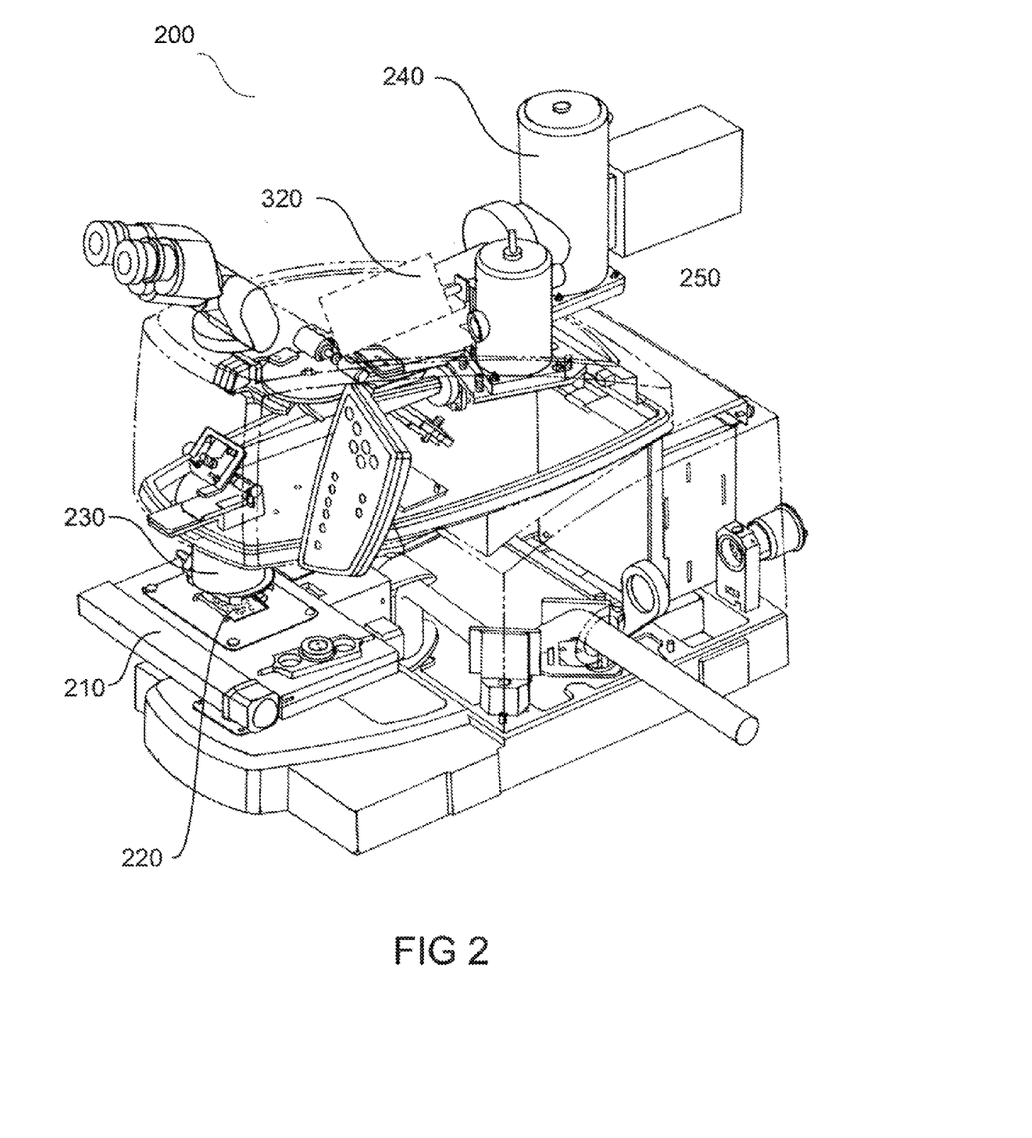
FIG. 2 is an isometric view of an infrared microscope according to an embodiment of the present invention.

Referring now to FIG. 2, the infrared microscope 200 according to a representative embodiment is shown. The infrared microscope 200 comprises a sample stage 210 for supporting a sample 220. When the infrared microscope 200 is operated in transmission mode, infrared light from an infrared source (not shown), is directed upwardly through the sample 220. When the infrared microscope 200 is operated in reflectance mode, infrared light is directed downwardly through the objective 230 onto the sample 220. In both cases, radiation emanating from the sample 220 is collected by objective 230 and focussed in the image plane (not shown in FIG. 2—see FIGS. 3A and 3B). The radiation emerging from an image plane is directed to an infrared detector provided in the form of an FPA detector 240. The microscope may optionally include an alternate infrared detector type such as, for example, a single element detector 250.

Figure 3A:
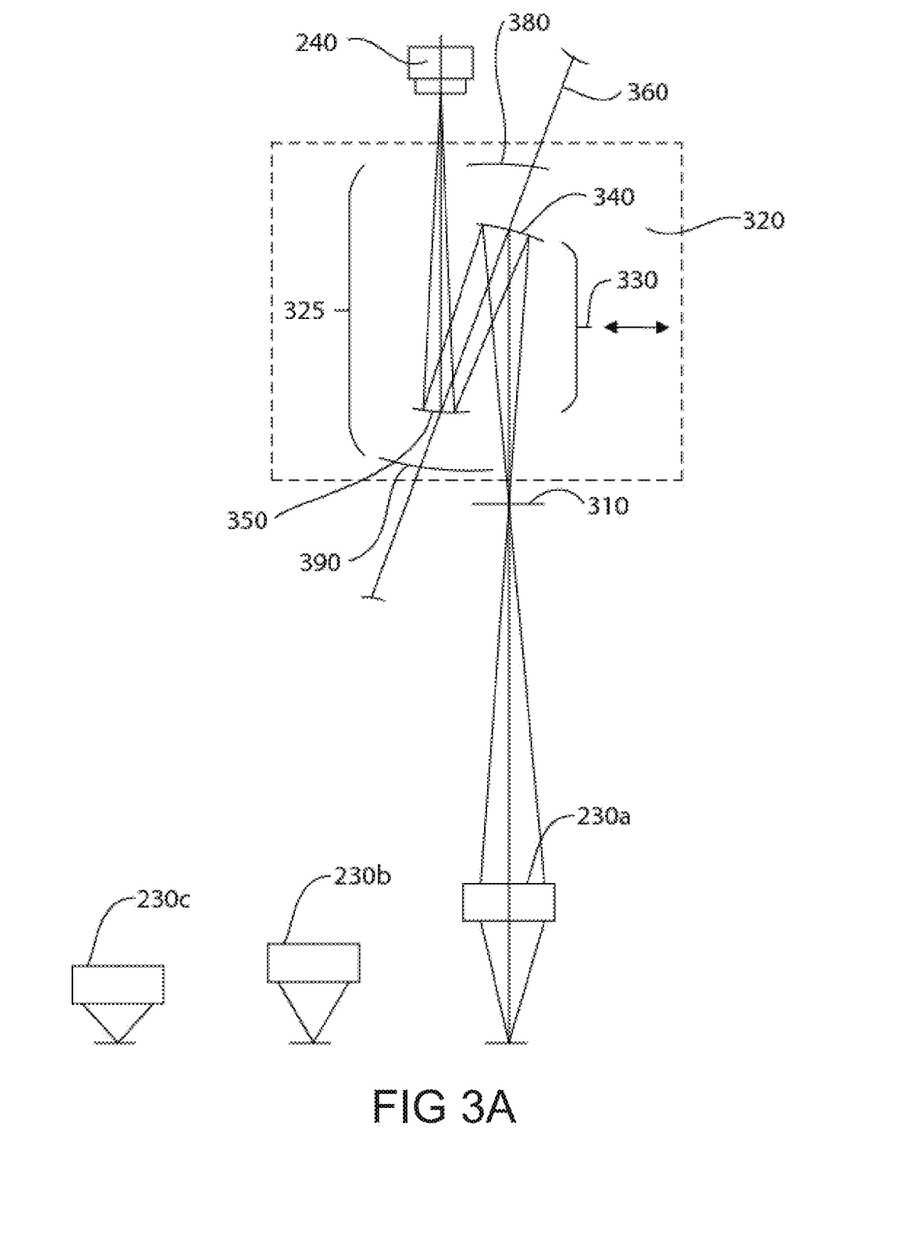
FIG. 3A is a schematic optical diagram showing the elements of the infrared microscope with the magnifying assembly of the present invention in an operative position according to an embodiment.
Figure 3B:
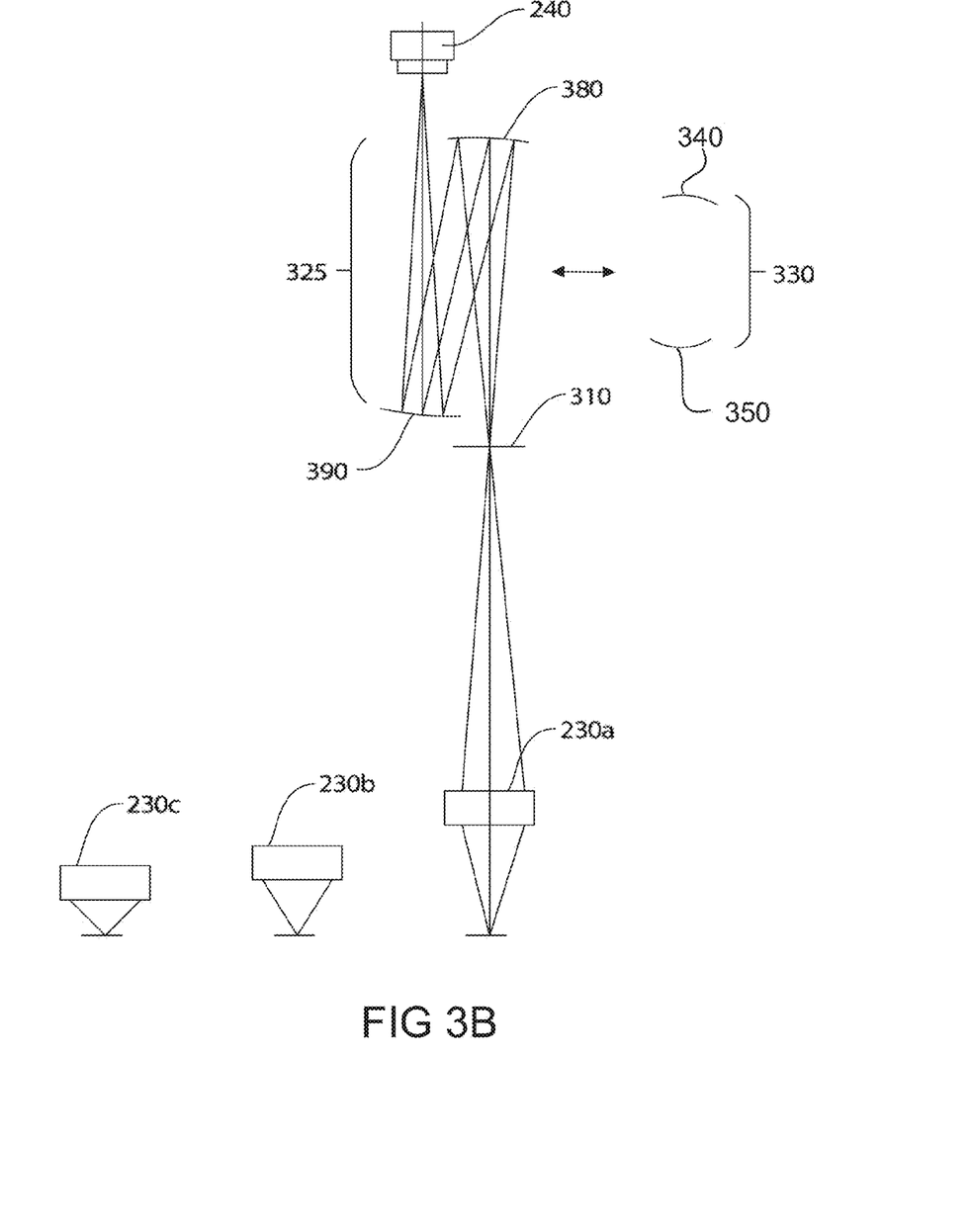
FIG. 3B is a schematic optical drawing showing the elements of the infrared microscope with the magnifying assembly of the present invention in an inoperative position according to an embodiment.

Referring now to FIGS. 3A and 3B, there is shown an optical representation of an infrared microscope 200. The magnifying assembly 320 of the present invention enables the magnification of the microscope to be varied internally. The magnifying assembly 320 comprises a first set of reflective elements 325 and a second set of reflective elements 330. The first set of reflective elements 325 comprises two curved mirrors 380 and 390. The second set of reflective elements 330 also comprises two curved mirrors 340 and 350. Notably, other types of reflective elements within the purview of one of ordinary skill in the art are contemplated to realize the magnifying assembly 320. For example, substantially flat mirrors could be used in combination with curved mirrors. Moreover, the combination of other mirrors and lens elements to realize the magnifying assembly 320 are also contemplated. Moreover, adaptive, active, or deformable reflective optics are also contemplated. Finally, reflective and focusing optical elements contemplated for use in the magnifying assembly include holographic optical elements (HOEs).

Figure 3C:
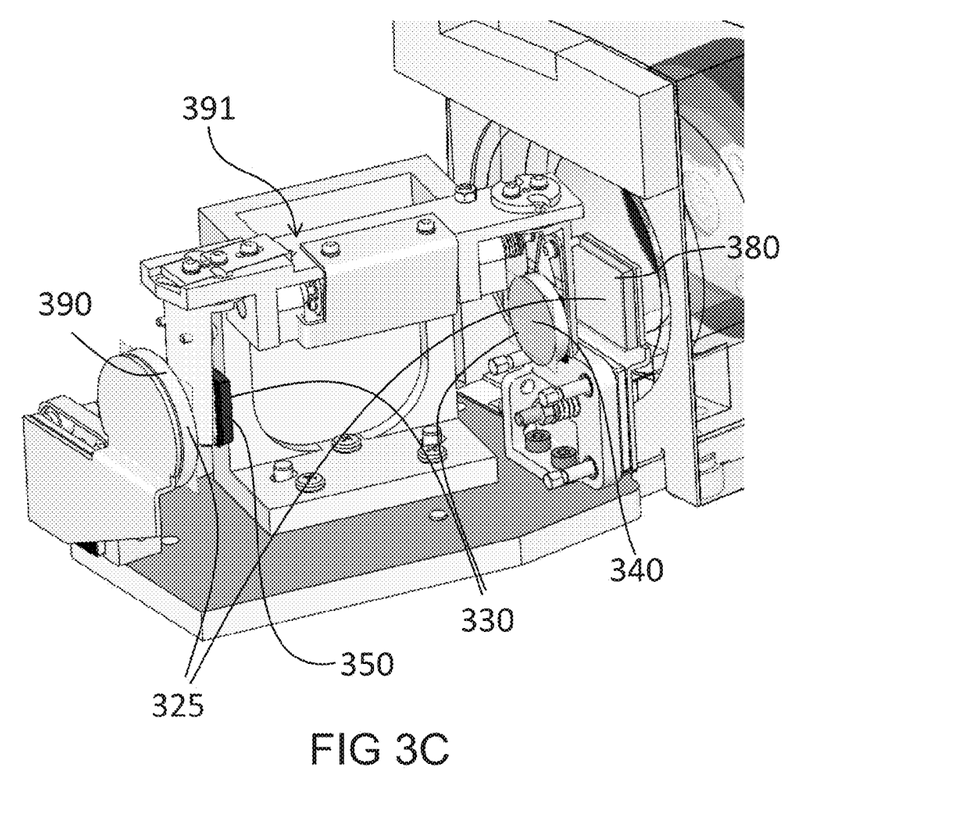
FIG. 3C is a perspective view showing a mechanism moving a set of reflective elements from operative position and an inoperative position in accordance with a representative embodiment.

In a representative embodiment, the first set of reflective elements 325 is substantially static, and as such, is substantially fixed in position or embedded in the optical path without significant movement. By contrast, the second set of reflective elements 330 is configured to move between an inoperative position and an operative position. Movement is made by a mechanical assembly (not shown) adapted for precision optical assemblies. The use of robotics and electrical motor assemblies are contemplated for use in connection with the mechanical assembly. In a representative embodiment described below in connections with FIGS. 30 and 3D, the mechanism 391 pivots the pre-focused high magnification assembly by greater than approximately 90°, bringing the second set of reflective elements 330 into and out of the low magnification beam, by means of a motor drive. The same result could be achieved using a manual or mechanical sliding mechanism, rather than a pivot, or manual or mechanical rotation of reflective elements with different magnifying powers about an axis.

In FIG. 3A, the second set of reflective elements 330 is shown in the operative position. In the operative position, radiation is incident on the second set of reflective elements 330. With the second set of reflective elements 330 in this position, curved mirrors 340 and 350 effectively block curved mirrors 380 and 390 which comprise the first set of reflective elements 325. Therefore, radiation will only be incident on the second set of reflective elements 330 and not on the first set of reflective elements 325 at all, when the second set of reflective elements is in the operative position.

By contrast, as depicted in FIG. 3B, when the second set of reflective elements 330 is moved to the inoperative position, curved mirrors 380 and 390 are no longer blocked. Accordingly, when the second set of reflective elements 330 is in the inoperative position, radiation is incident on the first set of reflective elements 325 only. Moving the second set of reflective elements 330 in and out of the optical path varies the factor of magnification. The resulting factor of magnification with the second set of reflective elements 330 in the operative position typically lies in the order of approximately 5.

Illustratively, the curved mirrors 340 and 350 are arranged substantially opposing each other. The curved mirrors 340 and 350 are substantially centered with respect to alignment axis 360 (see FIG. 3A) extending between curved mirror 340, and curved mirror 350. Similarly, curved mirrors 380 and 390 are also arranged substantially opposing each other.

Curved mirrors 340 and 350 comprising the second set of reflective elements 330 move between the operative and inoperative positions substantially in unison, that is, as a single unit. Notably, the curved mirrors 340 and 350 are arranged in a substantially fixed position relative to each other such that they are not moveable between the operative and inoperative positions independently of one another.

Movement between the operative and inoperative positions can be effected by rotation of the second set of reflective elements 330, in and out of the optical path about a rotational axis lying substantially parallel to the earlier described alignment axis 360.

The magnifying assembly 320 is positioned within the infrared microscope 200 between the intermediate image plane 310 and the FDA detector 240. This configuration has a number of advantages, not least of which is that the magnifying assembly 320 of the present teachings can be incorporated into an infrared microscope 200 during manufacture, or may be retrofit to an existing infrared microscope.

Moreover, various magnifications are possible in an infrared microscope fitted with the magnifying assembly 320 of the present invention, through use of the magnifying assembly in combination with changing the objective 230a, 230b and 230c externally to provide various factors of magnification. In addition, if it were desired to employ the single element detector 250 rather than the FPA detector 240, having the magnifying assembly 320 between the intermediate image plane 310 and the FPA detector 240 means that radiation propagated to the single element detector 250 need not be affected by the magnifying assembly.

It is another advantage of the present invention, that the having the second set of reflective elements 330 arranged in fixed relation to each other such that they move between the operative and inoperative positions in unison, offers simplified and more stable alignment of the magnifying assembly 320 to provide improved repeatability when compared to prior art solutions. That is since the two curved mirrors 340 and 350 are moved in or out of the optical path, or from the operative to the inoperative position, by a single movement. Moreover, having minimal curved mirrors 340, 350 or 380, 390 respectively, impinging on the optical path, (i.e. to two elements) minimizes loss of radiation and thereby maximizes optical throughput. Use of reflective elements such as mirrors in the magnifying assembly as opposed to the lenses used in prior art systems, has the added advantage of covering a broad range of wavelengths from ultraviolet to infrared.

Referring to FIG. 30, the infrared microscope 200 according to a representative embodiment is depicted and comprises a mechanism 391 moves the second set of reflective elements 330 into and out of the operative position (e.g., as oriented in FIG. 3A). Notably, in FIG. 3C, the mechanism 391 is in a first position that orients the pre-focused the second set of reflective elements 330 in the operative position. In the operative position, radiation is incident on the second set of reflective elements 330. With the second set of reflective elements 330 in this position, curved mirrors 340 and 350 effectively block curved mirrors 380 and 390 which comprise the first set of reflective elements 325. Therefore, radiation will only be incident on the second set of reflective elements 330 and not on the first set of reflective elements 325 at all, when the second set of reflective elements is in the operative position.

Figure 3D:
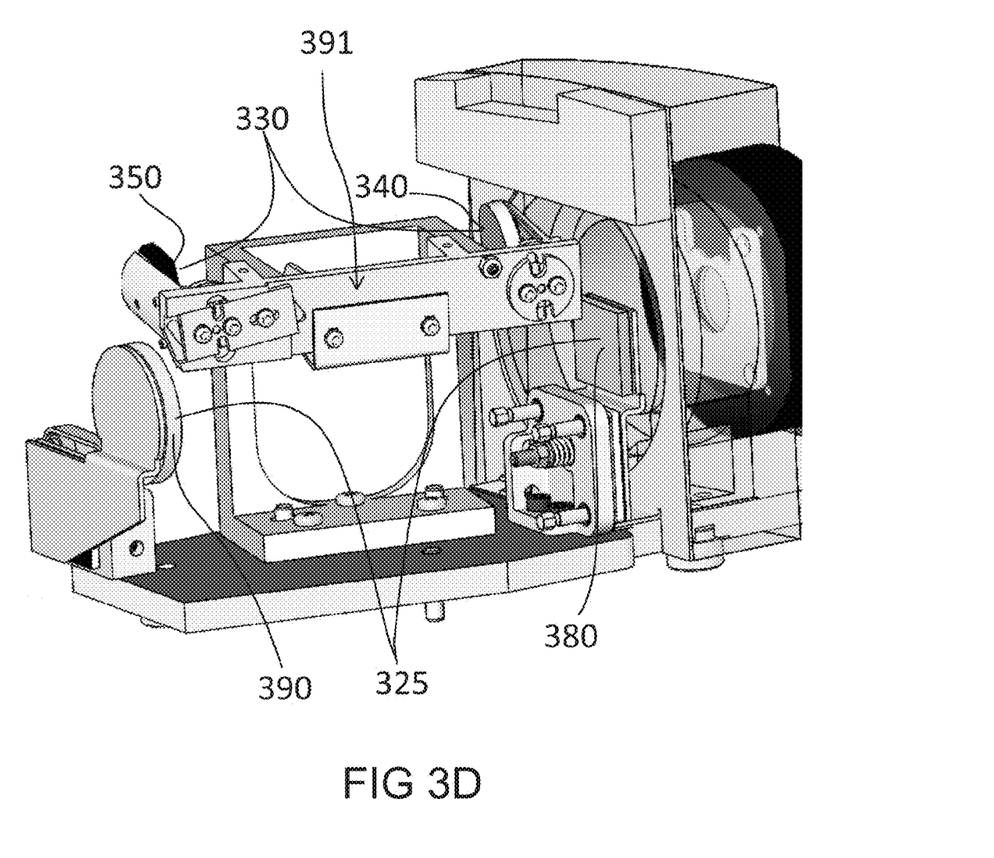
FIG. 3D is a perspective view showing a mechanism moving a set of reflective elements from an operative position and an inoperative position in accordance with a representative embodiment.

Referring to FIG. 30, the mechanism 391, which is essentially a pivoting structure, is in a second position that orients the pre-focused second set of reflective elements 330 in the inoperative position (e.g., as oriented in FIG. 3B). As noted above, movement of the mechanism 391 between the first and second positions can be effected using a suitable electrical motor, for example under instructions from a controller or other suitable computing device, or manually. With the second set of reflective elements 330 moved to the inoperative position, curved mirrors 380 and 390 are no longer blocked. Accordingly, when the second set of reflective elements 330 is in the inoperative position, radiation is incident on the first set of reflective elements 325 only.

One of ordinary skill in the art will appreciate that many variations that are in accordance with the present teachings are possible and remain within the scope of the appended claims. These and other variations would become clear to one of ordinary skill in the art after inspection of the specification, drawings and claims herein. The invention therefore is not to be restricted except within the spirit and scope of the appended claims.

The invention claimed is:

1. An infrared microscope comprising:
    a sample stage configured to support a sample;
    an objective configured to focus radiation emanated from the sample to an intermediate image plane between the objective and an infrared detector; and
    a magnifying assembly comprising a first set of reflective elements provided in a fixed position and a second set of reflective elements, the second set of reflective elements configured to move between an inoperative position in which radiation is incident on the first set of reflective elements and an operative position in which the radiation is incident on the second set of reflective elements and the second set of reflective elements effectively blocks the first set of reflective elements, wherein magnification provided by the magnifying assembly is varied.

2. An infrared microscope according to claim 1, wherein the second set of reflective elements is configured to move substantially in unison between the inoperative and the operative positions.

3. An infrared microscope according to claim 1, wherein the second set of reflective elements comprises two reflective elements arranged in fixed relation to each other.

4. An infrared microscope according to claim 3, wherein the reflective elements each comprise a curved mirror.

5. An infrared microscope according to claim 1, wherein the second set of reflective elements comprises two reflective elements opposing each other, each reflective element being substantially centered with respect to an alignment axis extending between a first of the second set of reflective elements and a second of the second set of reflective elements.

6. An infrared microscope according to claim 5, wherein the second set of reflective elements are configured to move between the operative position and the inoperative position by rotation about a rotational axis which lies substantially parallel to the alignment axis extending between the second set of reflective elements.

7. An infrared microscope according to claim 1, wherein the first set of reflective elements comprises two reflective elements.

8. An infrared microscope according to claim 7, wherein the reflective elements each comprise a curved mirror.

9. An infrared microscope according to claim 1, wherein the magnifying assembly is positioned such that radiation propagated to a single element detector rather than the infrared detector is substantially not affected by the magnifying assembly.

10. An infrared microscope according to claim 1, wherein the magnifying assembly is positioned between the intermediate image plane and the infrared detector.

11. A magnifying assembly accessory according to claim 10, wherein the second set of reflective elements comprises two reflective elements arranged in fixed relation to each other.

12. A magnifying assembly accessory according to claim 10, wherein the second set of reflective elements comprises two reflective elements oppose each other, each reflective element being substantially centred with respect to an alignment axis extending between a first of the second set of reflective elements and a second of the second set of reflective elements.

13. An infrared microscope according to claim 12, wherein the reflective elements each comprise a curved mirror.

14. A magnifying assembly accessory according to claim 10, wherein the first set of reflective elements comprises two reflective elements.

15. A magnifying assembly accessory according to claim 10, wherein the magnifying assembly is configured to be positioned between an intermediate image plane and an infrared detector of the infrared microscope.

16. A magnifying assembly accessory for an infrared microscope comprising:
a first set of reflective elements provided in a fixed position and a second set of reflective elements, the second set of reflective elements configured to move between an inoperative position in which radiation is incident on the first set of reflective elements and an operative position in which the radiation is incident on the second set of reflective elements and the second set of reflective elements effectively blocks the first set of reflective elements, whereby magnification provided by the magnifying assembly is varied.

17. A magnifying assembly accessory according to claim 16, wherein the reflective elements each comprise a curved mirror.

18. An infrared microscope comprising:
a sample stage configured to support a sample:
an objective for focusing radiation emanated from the sample to an intermediate image plane between the objective and an infrared detector; and
a magnifying assembly comprising a first set of reflective elements provided in a fixed position and a second set of reflective elements, the second set of reflective elements configured to move between an inoperative position in which radiation is incident on the first set of reflective elements and an operative position in which the radiation is incident on the second set of reflective elements and the second set of reflective elements effectively blocks the first set of reflective elements, whereby magnification provided by the magnifying assembly is varied, and the magnifying assembly is positioned between the intermediate image plane and the infrared detector.

* * * * *

UNITED STATES PATENT AND TRADEMARK OFFICE
CERTIFICATE OF CORRECTION

PATENT NO. : 9,625,695 B2
APPLICATION NO. : 14/310143
DATED : April 18, 2017
INVENTOR(S) : Yinsheng Sun et al.

It is certified that error appears in the above-identified patent and that said Letters Patent is hereby corrected as shown below:

On the Title Page

In item (72), in Column 1, in "Inventors", Line 1, delete "Glen Waverly" and insert -- Glen Waverley --, therefor.

In the Specification

In Column 2, Line 12, delete "in" and insert -- In --, therefor.

In Column 5, Line 5, delete "FIGS. 30" and insert -- FIGS. 3C --, therefor.

In Column 5, Line 55, delete "FDA" and insert -- FPA --, therefor.

In Column 6, Line 21, delete "FIG. 30," and insert -- FIG. 3C, --, therefor.

In Column 6, Line 37, delete "FIG. 30," and insert -- FIG. 3D, --, therefor.

In the Claims

In Column 8, Line 32, in Claim 18, delete "sample:" and insert -- sample; --, therefor.

Signed and Sealed this
Sixth Day of June, 2017

Michelle K. Lee
*Director of the United States Patent and Trademark Office*